US012566777B2

(12) United States Patent
Lee et al.

(10) Patent No.: US 12,566,777 B2
(45) Date of Patent: Mar. 3, 2026

(54) SYSTEMS AND METHODS OFFLINE DATA SYNCHRONIZATION

(71) Applicant: Interaptix Inc., Toronto (CA)

(72) Inventors: Dae Hyun Lee, Etobicoke (CA); Tyler James Doyle, Toronto (CA)

(73) Assignee: INTERAPTIX INC., Toronto (CA)

( * ) Notice: Subject to any disclaimer, the term of this patent is extended or adjusted under 35 U.S.C. 154(b) by 0 days.

(21) Appl. No.: 18/235,407

(22) Filed: Aug. 18, 2023

(65) Prior Publication Data

US 2024/0070168 A1      Feb. 29, 2024

Related U.S. Application Data

(60) Provisional application No. 63/402,271, filed on Aug. 30, 2022.

(51) Int. Cl.
| | |
|---|---|
| *G06F 7/00* | (2006.01) |
| *G06F 16/27* | (2019.01) |
| *G06F 17/00* | (2019.01) |
| *H04L 67/1095* | (2022.01) |
| *H04L 67/12* | (2022.01) |

(52) U.S. Cl.
CPC ........ *G06F 16/275* (2019.01); *H04L 67/1095* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2015/0009214 A1* | 1/2015 | Lee .......................... | G06T 17/10 |
| | | | 345/420 |
| 2015/0324636 A1* | 11/2015 | Bentley ................. | A63F 13/212 |
| | | | 386/227 |
| 2017/0134619 A1* | 5/2017 | Narayanswamy ..... | H04N 23/90 |
| 2020/0011668 A1* | 1/2020 | Derhy .............. | A61B 1/000094 |

* cited by examiner

*Primary Examiner* — Tuan A Pham
(74) *Attorney, Agent, or Firm* — Perry + Currier Inc.

(57) ABSTRACT

An example method for offline data synchronization to generate a representation of a space includes: localizing a data capture device in the space; detecting, by the data capture device, a nearby additional data capture device; in response to detecting the additional data capture device, establishing a communications channel to the additional data capture device; generating data representing the space; generating synchronization data based on the generated data; and sending the synchronization data to the additional capture device via the communications channel.

13 Claims, 6 Drawing Sheets

Block 225

500

504
Receive a frame of a target
area of the space

508
Determine pose information
within the target area

512
Convert pose information into
visual representation data

516
Update a stored representation
of the space based on the
visual representation data

SYSTEMS AND METHODS OFFLINE DATA SYNCHRONIZATION

CROSS-REFERENCE TO RELATED APPLICATION(S)

This application claims the benefit of U.S. Provisional Patent Application No. 63/402,271, filed Aug. 30, 2022, entitled "SYSTEMS AND METHODS OFFLINE DATA SYNCHRONIZATION"; the entire contents of which are incorporated herein by reference.

FIELD

The specification relates generally to generating data representing a space, and more particularly to a system and method for offline data synchronization of data pertaining to a representation of a space.

BACKGROUND

Virtual representations of spaces, such as 3D models, can be useful to allow remote viewers to view a space. The representations may be updated periodically by capturing or generating new data representing the space or adding metadata to provide additional context to the space. When data capture devices used to generate the data representing the space are offline during the data generation operation, the data capture devices may upload the generated data when they return online. However, when two or more data capture devices generate data representing the same portion of a space, conflicts in the generated data may be difficult to resolve.

SUMMARY

An aspect of the specification provides a method for offline data synchronization for a representation of a space, the method including: localizing a data capture device in the space; detecting, by the data capture device, a nearby additional data capture device; in response to detecting the additional data capture device, establishing a communications channel to the additional data capture device; generating data representing the space; generating synchronization data based on the generated data; and sending the synchronization data to the additional capture device via the communications channel.

An aspect of the specification provides a method, further including: receiving, from the additional capture device via the communications channel, incoming synchronization data; and updating a locally stored representation of the space based on the incoming synchronization data.

An aspect of the specification provides a method, further including in response to detecting a connection to a server configured to manage the representation of the space, sending the updated locally stored representation of the space to the server.

An aspect of the specification provides a method, wherein the communications channel includes one of: a wireless local area network communications channel and a short-range wireless communications channel.

An aspect of the specification provides a method, further including: detecting a disconnection from a server configured to manage the representation of the space; and performing the detecting of the additional nearby data capture device in response to detecting the disconnection.

An aspect of the specification provides a method, wherein the synchronization data further includes a location of the data capture device.

An aspect of the specification provides a method, wherein the synchronization data further includes annotations.

An aspect of the specification provides a method, wherein detecting the additional data capture device includes broadcasting a signal to identify nearby data capture devices.

An aspect of the specification provides a method wherein generating data representing space includes: receiving a frame from the first data capture device of a target area of the space; determining pose information within the target area; converting the pose information into visual representation data; updating a stored representation of the space based on the visual representation data.

An aspect of the specification provides a method wherein the determining pose information within the target area includes using a Simultaneous Localization and Mapping (SLAM) algorithm.

An aspect of the specification provides a method wherein the sending synchronization data to the additional capture device includes sending the pose information and depth frame.

An aspect of the specification provides a method wherein the sending synchronization data to the additional capture device includes sending data points within the target area.

An aspect of the specification provides a method wherein a plurality of additional capture devices each perform the steps in method for sharing amongst the capture devices.

An aspect of the specification provides a method wherein the sending synchronization data to the additional capture device includes volumetric information.

An aspect of the specification provides a method wherein the volumetric information is based on at least one of voxels and TDSF volume.

An aspect of the specification provides a system including: a server to manage a representation of a space; a first data capture device configured to connect to the server and to generate first data representing the space; and a second data capture device configured to connect to the server and to generate second data representing the space; wherein, in response to detecting a disconnection from the server, the first data capture device is further configured to: detect the second data capture device as being nearby; and initiate offline data synchronization of the space with the second data capture device to synchronize respective locally stored representations of the space at the first data capture device and the second data capture device.

An aspect of the specification provides a system, wherein to initiate offline data synchronization, the first data capture device is configured to: establish a communications channel with the second data capture device; and exchange synchronization data with the second data capture device via the communications channel.

An aspect of the specification provides a system, wherein to exchange synchronization data with the second data capture device, the first data capture device is configured to: generate first synchronization data including the first data representing the space; and send the first synchronization data to the second data capture device.

An aspect of the specification provides a system, wherein to exchange synchronization data with the second data capture device, the first data capture device is configured to: receive second synchronization data including the second data representing the space; and update a locally stored representation of the space with the second synchronization data.

An aspect of the specification provides a system, wherein the synchronization data further includes one or more of: a location of the first data capture device; a location of the second data capture device; and annotations.

BRIEF DESCRIPTION OF DRAWINGS

Implementations are described with reference to the following figures, in which.

DETAILED DESCRIPTION

Figure 1:
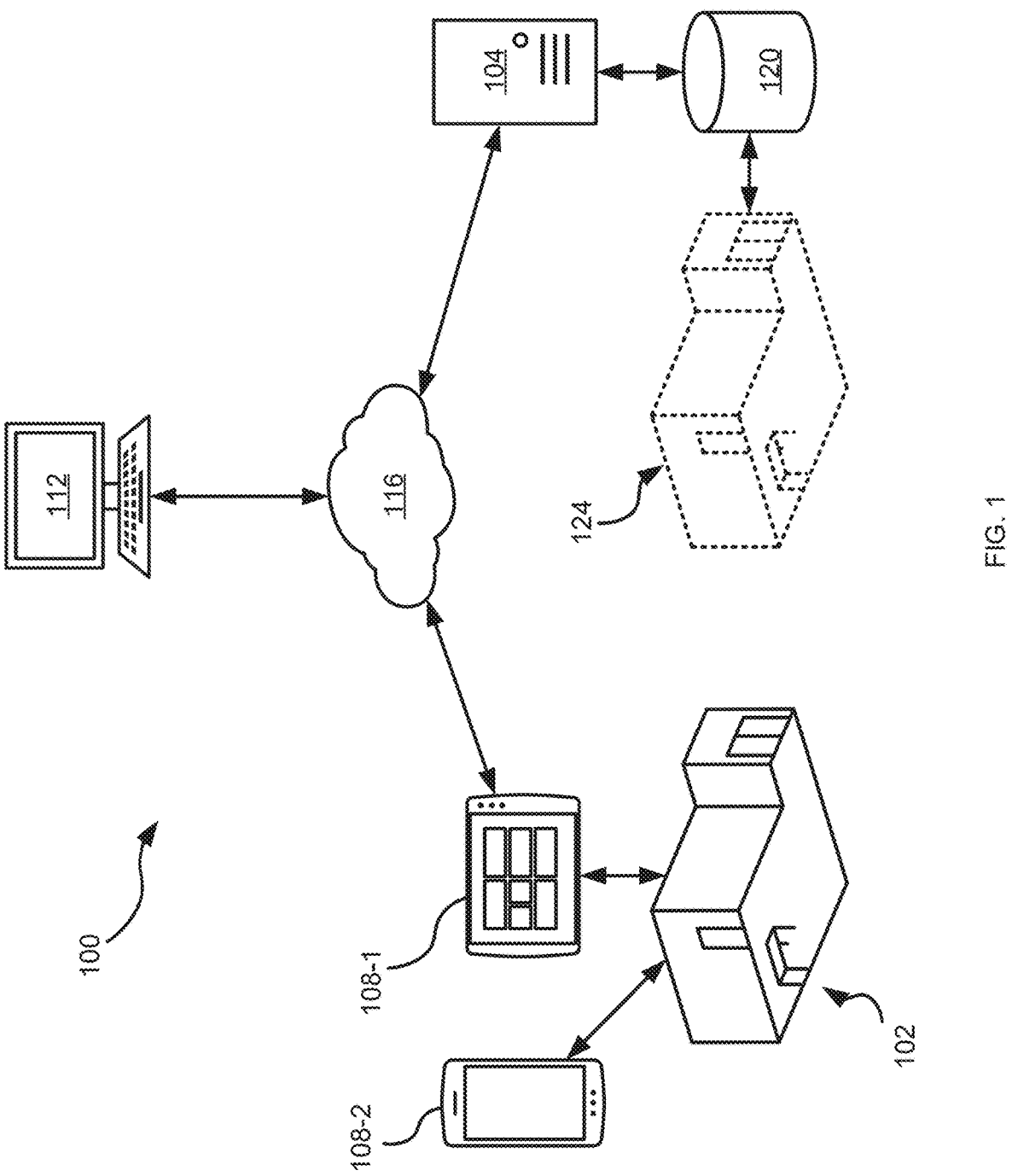
FIG. 1 depicts a block diagram of an example system for synchronized data capture.

FIG. 1 depicts a block diagram of an example system 100 for offline data synchronization of data pertaining to a representation of a space 102. For example, space 102 can be a factory or other industrial facility, an office a new building, a private residence, or the like. In other examples, the space 102 can be a scene including any real-world location or object, such as a construction site, a vehicle such as a car, truck, container, ship, or the like, equipment, or the like. It will be understood that space 102 as used herein may refer to any such scene, object, target, or the like. System 100 includes a server 104 and a client device 112 which are preferably in communication via a network 116. System 100 additionally includes a first data capture device 108-1 and a second data capture device 108-2 (referred to herein generically as a data capture device 108 and generically as data capture devices 108) which can each also be in communication with at least server 104 via network 116.

Server 104 is generally configured to generate and manage a representation of space 102 based on the spatial data (i.e., data representing the space) captured and generated by data capture devices 108 and received at server 104. Server 104 can be any suitable server or computing environment, including a cloud-based server, a series of cooperating servers, and the like. For example, server 104 can be a personal computer running a Linux operating system, an instance of a Microsoft Azure virtual machine, etc. In particular, server 104 includes a processor and a memory storing machine-readable instructions which, when executed, cause server 104 to update a representation of space 102, as described herein. Server 104 can also include a suitable communications interface (e.g., including transmitters, receivers, network interface devices and the like) to communicate with other computing devices, such as data capture devices 108 and client device 112 via network 116.

Data capture devices 108 are devices capable of capturing and generating relevant data such as image data, depth data, audio data, other sensor data, combinations of the above and the like. Data capture devices 108 can therefore include components capable of capturing said data, such as one or more imaging devices (e.g., optical cameras), distancing devices (e.g., LIDAR devices or multiple cameras which cooperate to allow for stereoscopic imaging), microphones, and the like. For example, data capture devices 108 can be iPad Pros, manufactured by Apple, which includes LIDAR systems and cameras, head-mounted augmented reality systems, such as a Microsoft Hololens™, camera-equipped handheld devices such as smartphones or tablets, computing devices with interconnected imaging and distancing devices (e.g., an optical camera and a LIDAR device), or the like. Data capture devices 108 can implement simultaneous localization and mapping (SLAM), 3D reconstruction methods, photogrammetry, and the like. The actual configuration of data capture devices 108 is not particularly limited, and a variety of other possible configurations will be apparent to those of skill in the art in view of the discussion below.

Each data capture device 108 additionally includes a processor, a non-transitory machine-readable storage medium, such as a memory, storing machine-readable instructions which, when executed by the processor, can cause data capture device 108 to perform data capture and generation operations and offline data synchronization operations, as described herein. In particular, the data capture and generation operations performed by data capture devices 108 allows synchronization of the locally stored representations at each data capture device 108, so that the spatial data (i.e., both captured data and generated metadata) provided to server 104 to generate representation 124 is harmonized. That is, data capture devices 108 may synchronize with one another prior to providing the spatial data to server 104 so as not to provide conflicting spatial data to server 104 to resolve.

Each data capture device 108 can also include a display, such as an LCD (liquid crystal display), an LED (light-emitting diode) display, a heads-up display, or the like to present a usual with visual indicators to facilitate the data capture operation. Each data capture device 108 also includes a suitable communications interface (e.g., network interfaces, transceivers, and the like) to communicate with other computing devices, such as server 104 via network 116. Each data capture device 108 also includes a suitable communications interface to communicate locally, for example via a wireless local area network (WLAN) (e.g., WiFi communications), via a short-range wireless communications protocol (e.g., Bluetooth communications) or the like.

Client device 112 is generally configured to present a representation of space 102 to a user and allow the user to interact with the representation, including providing inputs and the like, as described herein. Client device 112 can be a computing device, such as a laptop computer, a desktop computer, a tablet, a mobile phone, a kiosk, or the like. Client device 112 includes a processor and a memory, as well as a suitable communications interface to communicate with other computing devices, such as server 104 via network 116. Client device 112 further includes one or more output devices, such as a display, a speaker, and the like, to provide output to the user, as well as one or more input devices, such as a keyboard, a mouse, a touch-sensitive display, and the like, to allow input from the user.

Network 116 can be any suitable network including wired or wireless networks, including wide-area networks, such as the Internet, mobile networks, local area networks, employing routers, switches, wireless access points, combinations of the above, and the like.

System 100 further includes a database 120 associated with server 104. For example, database can be one or more instances of My SQL or any other suitable database. Database 120 is configured to store data representative of space 102. In particular, database 120 is configured to store a persistent representation 124 of space 102, which tracks persistent spatial information over time. Other representations, including 2D representations (e.g., optical images, thermal images, etc.) and 3D representations (e.g., 3D scans, including partial scans, depth maps, etc.) may also be stored at database 120. Database 120 can be integrated with server 104 (i.e., stored at server 104), or database 120 can be stored separately from server 104 and accessed by the server 104 via network 116.

Figure 2:
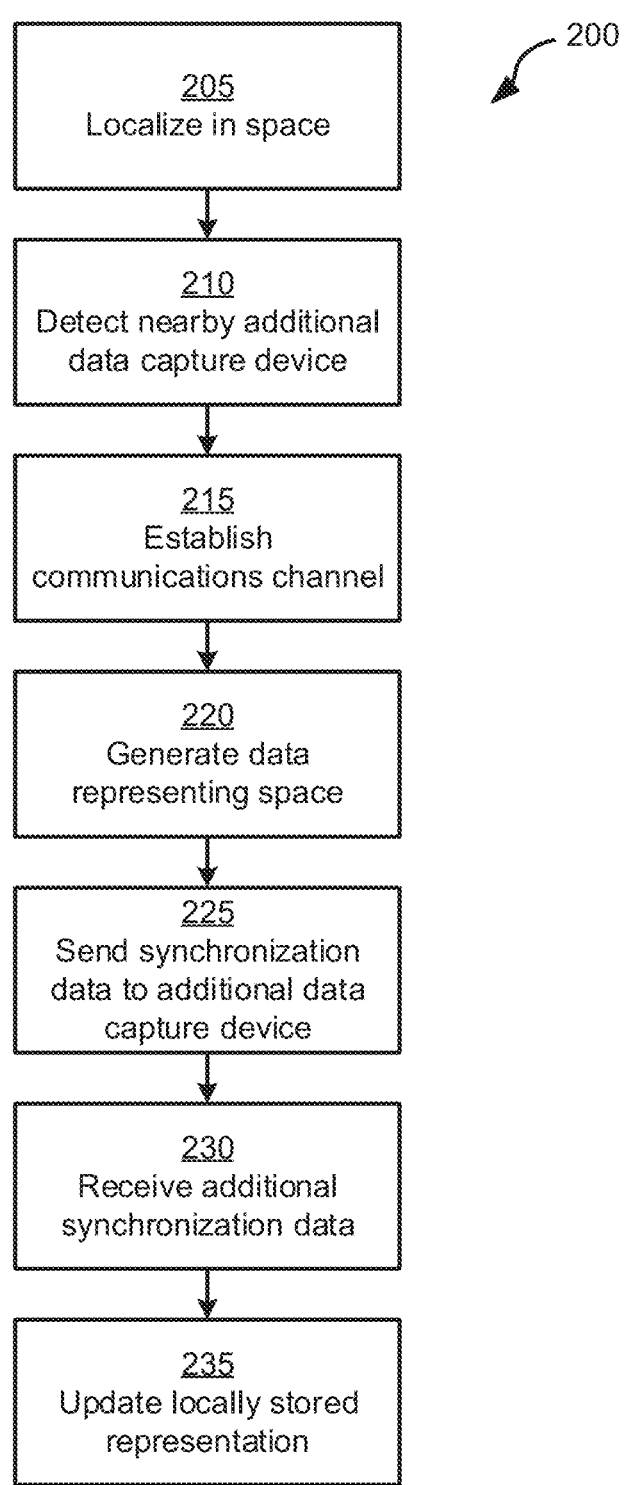
FIG. 2 depicts a flowchart of an example method of offline data synchronization at a data capture device of FIG. 1.

Referring to FIG. 2, an example method 200 of offline data synchronization of space 102 is depicted. As used herein, spatial data may include both captured data representing the space, as well as the user- or device-generated metadata representing the space, including, for example, annotations, notes, comments, and the like. Method 200 is described below in conjunction with its performance by data capture device 108-1, however in other examples, method 200 may be performed by data capture device 108-2 or other suitable devices or systems. In some examples, some of the blocks of method 200 can be performed in an order other than that illustrated.

At block 205, data capture device 108-1 localizes in space 102. That is, data capture device 108-1 may capture image data and/or depth data to establish its location within space 102, as well as a frame of reference. The localization of data capture device 108-1 allows data capture device 108-1 to track its location within space 102 as well as the locations of the spatial data representing space 102.

In some examples, at block 205, data capture device 108-1 may further obtain data regarding the data to be captured in space 102. For example, data capture device 108-1 may obtain a most recent representation (e.g., representation 124) to be stored locally at data capture device 108-1. In some examples, data capture device 108-1 may additionally obtain target capture points representing target locations in space 102 at which data is to be captured or metadata (e.g., annotations, user confirmations, etc.) is to be generated representing a given portion of space 102. Data capture device 108-1 may obtain such representations and target capture points, for example, from server 104.

At block 210, data capture device 108-1 may detect other nearby data capture devices, such as data capture device 108-2, or other additional data capture devices.

To detect nearby data capture devices, data capture device 108-1 may broadcast a signal (e.g., via Bluetooth, WiFi, or other suitable wireless local area communications protocol) and wait for a response from one or more nearby additional data capture devices, such as data capture device 108-2. As will be appreciated, in other examples, data capture device 108-1 may detect a signal requesting identification of nearby additional data capture devices, for example broadcast by data capture device 108-2, and send a response to said signal.

In some examples, block 210 may be performed in response to detecting that data capture device 108-1 is offline (i.e., disconnected from server 104 and/or network 116). In particular, if data capture devices 108-1 and 108-2 are online and connected to server 104, data capture devices 108 may send spatial data to server 104 in real time. Server 104 may then resolve any conflicting spatial data (i.e., any captured data representing the same portion of space 102) by overwriting older spatial data with the spatial data generated or captured most recently.

However, when data capture devices 108-1 and/or 108-2 are offline, such conflict resolution at server 104 may be more difficult. In particular, conflict may generally arise when multiple users are using data capture devices 108-1 and 108-2 to add metadata to space 102, such as by adding annotations, labels, comments, and the like, and/or when handling data capture requests when offline, or the like. In other examples, conflicts may arise when data capture devices 108 are sufficiently close within space 102 that they may capture conflicting data representing the same portion of space 102. Accordingly, if data capture devices 108 are sufficiently close as to potentially capture and generate conflicting data and/or metadata, data capture devices 108 may also be sufficiently close to establish a direct communications channel. Thus, if data capture device 108-1 detects another nearby additional data capture device, such as data capture device 108-2, in particular while data capture device 108-1 is offline, such a detection may trigger the offline data synchronization operation described herein.

In some examples, data capture device 108-1 may additionally initiate data synchronization operations simply in response to detecting a nearby additional data capture device, even when online. Further, in some examples, data capture device 108-1 may apply a threshold communications channel strength. That is, if the signal between data capture devices 108-1 and 108-2 is sufficiently weak (i.e., below a threshold strength), data capture device 108-1 may determine that data capture device 108-2 is not "nearby" and is unlikely to capture conflicting data.

As will be appreciated, block 210 may be run periodically (e.g., every 30 seconds, every minute, every 5 minutes, etc.) while data capture device 108-1 is offline and/or while data capture device 108-1 is performing a data capture operation (including while online) to determine whether an additional data capture device is nearby, with which data capture device 108-1 should perform a data synchronization operation.

At block 215, data capture device 108-1 establishes a communications channel to the additional data capture device (i.e., data capture device 108-2 in the present example). For example, as part of the broadcast and/or response sequence to detect data capture device 108-2 at block 210, data capture devices 108-1 and 108-2 may exchange media access control (MAC) addresses and other relevant information to establish the communications channel. The data exchanged between data capture devices 108-1 and 108-2 to establish the communications channel may vary based on the communications protocol employed. Generally, the communications channel provides a direct channel between the data capture devices 108-1 and 108-2, independently of server 104. For example, the communications channel may be a WiFi channel, or other suitable wireless local area network channel, a Bluetooth channel, or other suitable short-range wireless communications channel, or the like. The data capture devices 108-1 and 108-2 may then communicate offline and exchange data directly with one another for the synchronized data capture operations.

At block 220, data capture device 108-1 generates spatial data representing space 102. Block 220 is performed typically when a capture device 108 in the space 102 generates or modifies any sort of information. The spatial data may include image data, video data, audio data, depth data, and other suitable types of data to represent space 102. In some examples, the spatial data generated at block 220 may additionally include user-generated data and/or metadata, such as annotations (e.g., including freehand drawings and the like overlaid on the captured data), text, symbols, and the like. The spatial data may, in some examples, be in accordance with the target capture points specified. In such examples, data capture device 108-1 may use the localization of data capture device 108-1 within space 102 to display various virtual and/or augmented reality guide elements displayed on data capture device 108-1 to assist a user of data capture device 108-1 with the data capture and/or user input operation.

The spatial data may be stored locally, for example in a memory of data capture device 108-1 along with metadata for the spatial data, including a location and orientation of data capture device 108-1 at the time the data was generated, a timestamp, and the like. In some examples, the metadata may additionally include an indication that a target data capture point requested by server 104 was satisfied.

At block 225, data capture device 108-1 generates synchronization data and sends the synchronization data to the nearby data capture device 108-2. The synchronization data may include the spatial data generated at block 220, including any user-generated data, such as annotations, and the like, and metadata associated with the captured data and the user-generated data. More particularly, the synchronization data may represent any new spatial data, since a most recent synchronization time.

Accordingly, to track and generate the synchronization data, data capture device 108-1 may locally store a representation of space 102 as well as a timestamp of a most recent synchronization of the locally stored representation. The synchronization data may be generated based on any updates or changes to the locally stored representation since the most recent synchronization. Data capture device 108-1 may then send the synchronization data to data capture device 108-2 via the communications channel established at block 215. Data capture device 108-1 may then update the timestamp of the most recent synchronization to reflect the current time.

At block 230, data capture device 108-1 receives incoming synchronization data from the nearby additional data capture device, namely data capture device 108-2. The incoming synchronization data may represent newly captured and/or user-generated data at data capture device 108-2 since a most recent synchronization at data capture device 108-2.

At block 235, data capture device 108-1 updates the locally stored representation based on the incoming synchronization data received at block 230. That is, data capture device 108-1 may incorporate the spatial data received as part of the synchronization data into the locally stored representation, as if such spatial data were captured or generated at data capture device 108-1 itself. As will be appreciated, such updates allow the locally stored representations at data capture device 108-1 and 108-2 to be synchronized with one another. Data capture device 108-1 may additionally update the timestamp of the most recent synchronization to reflect the current time, so that any subsequent synchronization data represents updates relative to the locally stored representation including the captured data captured by data capture device 108-2 and represented in the incoming synchronization data received at block 230.

Figure 3:
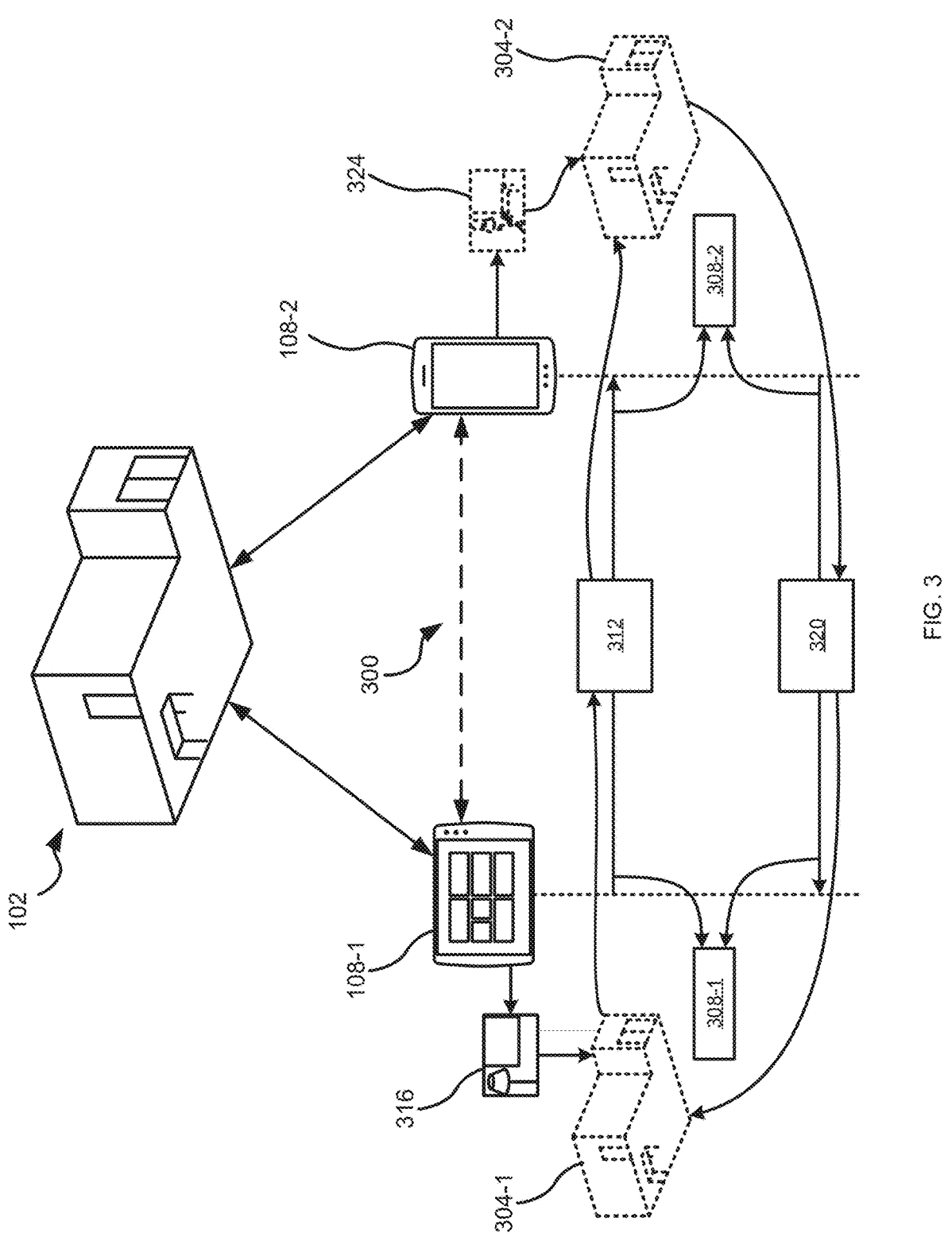
FIG. 3 depicts a schematic diagram of the offline data synchronization at blocks 220 to 235 of the method of FIG. 2.

For example, referring to FIG. 3, a schematic diagram of blocks 215 to 235 is depicted. When both data capture devices 108-1 and 108-2 are located in space 102, they may establish a communications channel 300 to allow them to communicate directly with one another.

Data capture device 108-1 may store a locally stored representation 304-1 of space 102 and a most recent synchronization time 308-1. Similarly, data capture device

108-2 stores a respective locally stored representation 304-2 of space 102 and a respective most recent synchronization time 308-2.

Upon capturing data representing space 102, data capture device 108-1 generates synchronization data 312 based on the spatial data. For example, data capture device 108-1 may capture an image 316 of a portion of space 102 to satisfy a request at a target data capture point. Data capture device 108-1 may update its locally stored representation 304-1. Data capture device 108-1 may additionally compare the locally stored representation 304-1 to a most recent locally stored representation (i.e., as of the most recent synchronization time 308-1) and use any differences to generate synchronization data 312.

The synchronization data 312 may therefore include the image 316, metadata representing the location and orientation of data capture device 108-1 when capturing the image 316, and an indication that request to capture data at the target data capture point was fulfilled. Data capture device 108-1 may then send the synchronization data 312 to data capture device 108-2. In response to sending synchronization data 312 to data capture device 108-1 may update the most recent synchronization time 308-1.

In response to receiving synchronization data 312, data capture device 108-2 may update its locally stored representation 304-2 to include the captured data of synchronization data 312 (namely, the image 316) as well as the generated data indicating that the target data capture point was fulfilled. Data capture device 108-2 may additionally update its most recent synchronization time 308-2. As will be appreciated, after processing the synchronization data 312, the locally stored representations 304-1 and 304-2 may be synchronized with one another, and the most recent synchronization times 308-1 and 308-2 may also match.

Conversely, when data capture device 108-2 captures data representing space 102, data capture device 108-2 generates synchronization data 320 based on the captured data. For example, data capture device 108-2 may capture image and depth data 324 simply to update the representation of space 102. Data capture device 108-2 may update its locally stored representation 304-2 and compare it to the most recent locally stored representation (i.e., as of the most recent synchronization time 308-2) and use any differences to generate synchronization data 320.

The synchronization data may therefore include the image and depth data 324 and metadata representing the location and orientation of data capture device 108-2 when capturing the image and depth data 324. Data capture device 108-2 may send the synchronization data 320 to data capture device 108-1 and update its most recent synchronization time 308-2.

In response to receiving synchronization data 320, data capture device 108-1 may similarly update its locally stored representation 304-1 to include the captured data of synchronization data 320 (namely, the image and depth data 324) and the corresponding metadata and its most recent synchronization time 308-1.

Figure 4:
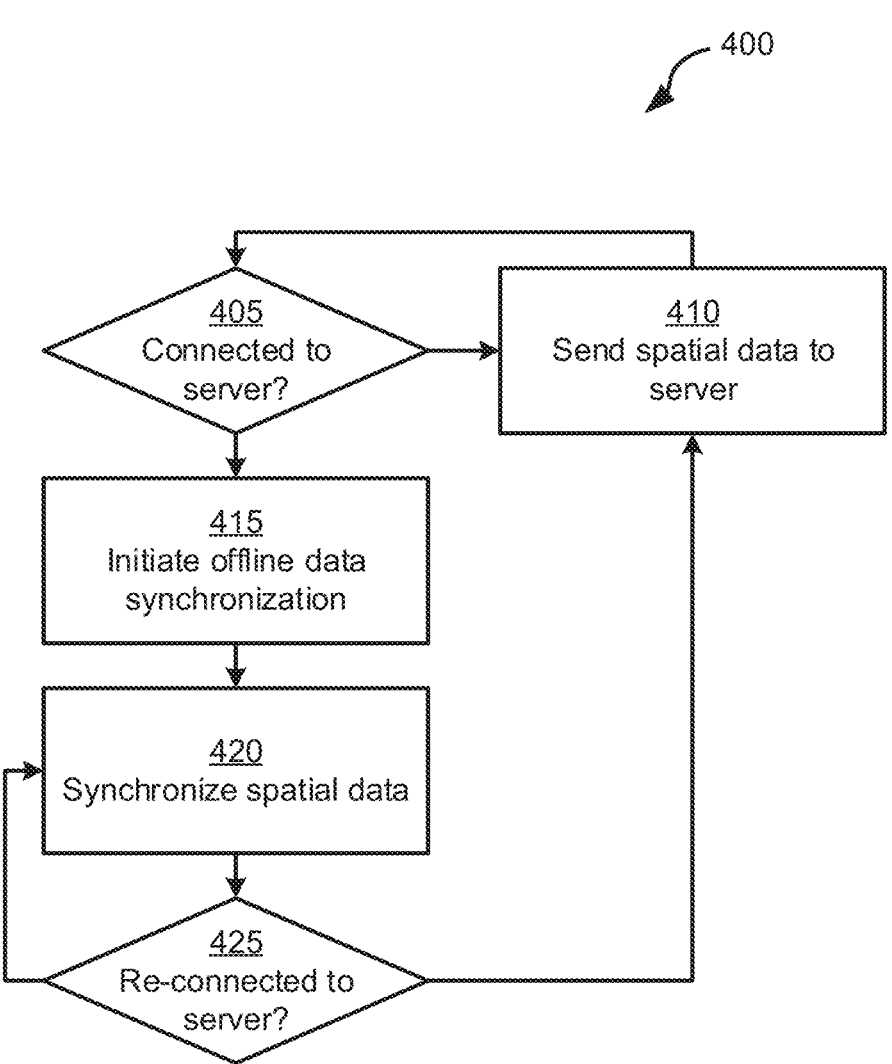
FIG. 4 depicts a flowchart of an example method of initiating offline data synchronization in the system of FIG. 1.

Turning now to FIG. 4, an example method 400 depicting the use of the offline data synchronization to update representation 124 at server 104 is shown. Method 400 is described below in conjunction with its performance by either data capture device 108, however in other examples, method 400 may be performed by other suitable devices or systems. In some examples, some of the blocks of method 400 can be performed in an order other than that illustrated.

At block 405, data capture device 108 determines whether it is connected to server 104. In particular, data capture device 108 may be configured to perform its data capture operations differently depending on its connectivity to server 104.

If the determination at block 405 is affirmative, that is, data capture device 108 is connected to server 104 (e.g., via network 116), then method 400 proceeds to block 410. At block 410, data capture device 108 may capture or generate spatial data in its usual fashion and send the spatial data to server 104 in real-time, or after completion of the data generation operation, as appropriate.

If the determination at block 405 is negative, that is data capture device 108 is not connected to server 104, then method 400 proceeds to block 415. At block 415, data capture device 108 initiates an offline mode to synchronize spatial data with any additional nearby data capture devices. For example, initiation of the offline data synchronization may include localization of data capture device 108 in space 102, detection of nearby additional data capture devices, and establishment of communications channels therebetween, for example, as described at blocks 205 to 215 of method 200. In some examples, data capture device 108 may be disconnected from server 104 in the middle of a data capture process, and hence may already be localized in space 102, and accordingly, may proceed directly to block 210 of method 200.

At block 420, data capture device 108 performs offline data synchronization with any other nearby additional data capture devices detected at block 415. In particular, data capture device 108 maintains synchronous locally stored representations with the nearby additional data capture devices, for example via performance of blocks 220 to 235 of method 200 to exchange synchronization data with the other nearby data capture devices. That is, data capture device 108 may generate synchronization data periodically or upon capture or generation of new spatial data representative of space 102. Data capture device 108 may then send said synchronization data to the nearby additional data capture devices to update their locally stored representations. Data capture device 108 may also receive incoming synchronization data and update its locally stored representation based on the incoming synchronization data. Other manners of synchronizing the locally stored representations of data capture device 108 with nearby additional data capture devices and/or of performing offline data synchronization are also contemplated.

At block 425, data capture device 108 determines whether it has reconnected to server 104. For example, data capture device 108 may continually and/or periodically attempt to reconnect to server 104 when the disconnection is unexpected. In other examples, data capture device 108 may reconnect to server 104 in response to a trigger or input from a user to reconnect to server 104.

If the determination at block 425 is negative, that is, data capture device 108 has not reconnected to server 104, then method 400 returns to block 420 to continue offline data synchronization operations.

If the determination at block 425 is affirmative, that is, data capture device 108 has reconnected to server 104, then method 400 proceeds to block 410 to send the spatial data to server 104 in response to the reconnection to server 104. In particular, the spatial data may be represented by any updates to the locally stored representation at data capture device 108, which may include spatial data captured or generated by data capture device 108 during the offline data synchronization at block 420, as well as data captured or generated by nearby additional data capture devices and synchronized to the locally stored representation at data capture device 108 during the offline data synchronization at block 420.

Notably, since the locally stored representations are synchronized amongst data capture device 108 and the nearby additional data capture devices, server 104 may receive multiple copies of the locally stored representations, but which are all synchronized and therefore contain the same spatial data. Accordingly, server 104 may readily merge the spatial data since no conflict should appear amongst the locally stored representations. This may also be resolved when one data capture device 108 captures or generates additional spatial data after coming back online, since said additional spatial data may have a later, non-conflicting time stamp, and hence may be accepted as a most recent update.

Figure 5:
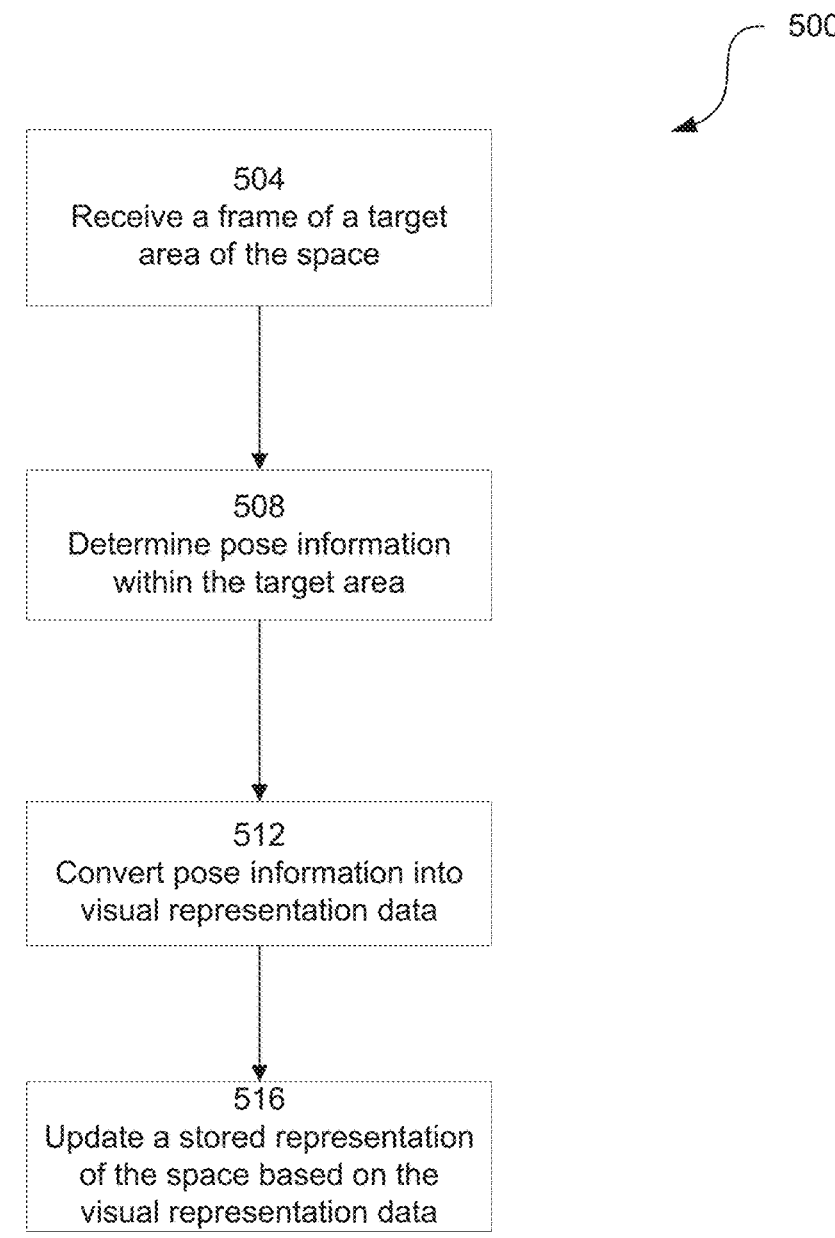
FIG. 5 shows an example of generating data of the method of FIG. 2.

It is to be understood that can be different ways to implement each block in method 200. For example, block 225, generating data representing space comprises, can be implemented using method 500 shown in FIG. 5.

(In general terms, method 500 can be performed during every frame of the scanning process, but the immediate discussion is for illustrative purposes. Furthermore, any data capture device 108 can perform method 500, but again, the immediate discussion is for illustrative purposes.)

Block 504 comprises receiving a frame from the first data capture device, The data capture device 108 can collect real-time information about a target area within space 102.

At block 508, pose information within the captured frame of the target area is determined. "Pose" typically refers to the orientation and position of objects within the frame. By understanding the pose, one can gain insights into the arrangement and alignment of objects or features in the space. Different methodologies might be applied in block 508, and alternate interpretations will be evident to those with expertise in the relevant art of spatial analysis.

Block 512 involves the conversion of the determined pose information into visual representation data. This can be a graphical or digital depiction of the spatial arrangement, enabling a visual interpretation of the target area's layout. This might involve the use of rendering software, graphics algorithms, computer vision algorithms or other visualization tools. Variations of block 512 may be apparent to those knowledgeable in visualization technologies.

Block 516 comprises updating a pre-existing stored representation of the space based on the newly generated visual representation data. If a digital twin or model of the space 102, this block keeps that model current with the most recent data. The exact method of updating can vary based on storage format, the data structures used, and other technological factors. Different techniques to achieve block 516 will come to mind for those skilled in spatial data management.

Figure 6:
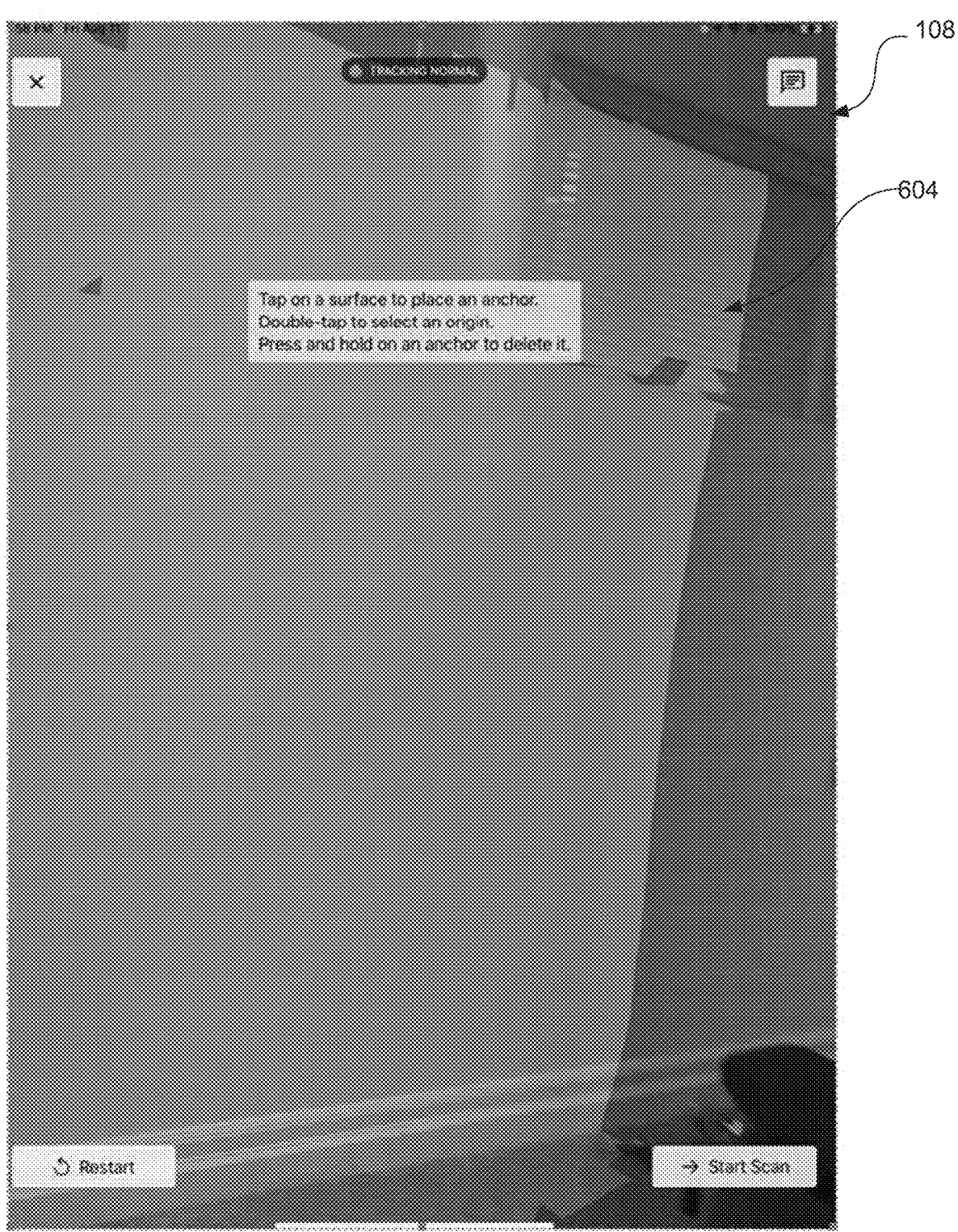
FIG. 6 shows an example display screen indicating status of a local cache relevant to a target area when connected the server.

Referring now to FIG. 6, an example of screen rendering generated on the display of device 108 is shown that can reflect contributions to the performance of method 500. The screen rendering can show the visual representation of the scan progress. The screen rendering can include a representation of a portion of space 102 including a target area 604. An non-limiting example instruction on the screen states "Tap on a surface to place an anchor. Double tap to select an origin. Press and hold an anchor to delete it." These instructions can be used to help define target area 604 for communication between devices 108 so that one device 108 can request capture of the target area 604 and another device 108 can be receive an identification of the target area 604 to be captured. FIG. 6 thus shows devices 108 the status of a local cache when connected to server 104. When the example in FIG. 6 is used during scanning, spatial coverage can be shared, so that the other device 108 progress is also visible and makes the scanning more efficient. Variants on the example in FIG. 6 will occur to those skilled in the art. However, other ways of defining target area 604 are contemplated and will occur to those skilled in the art.

While the foregoing describes certain embodiments, it should be understood that variations, combinations and/or subsets thereof are contemplated. For example, However, when devices 108 enter into a space 102 where they do not have any connections with server 104 system 100 enter a distributed state. Connections can be established by unique identifiers for space 102 and other spaces that is used internally on server 104. Alternatively, "persistent coordinates", can be used to find nearby devices 108 to create a session. ("Persistent coordinate" means that all the indoor space is connected and mapped to a single universal coordinate system, such as global positioning system (GPS) for outdoors, and to whatever extent it works indoors what limited indoors. Bluetooth beacons or Wi-Fi can also be used to identify internal and or external coordinates.)

The scope of the claims should not be limited by the embodiments set forth in the above examples but should be given the broadest interpretation consistent with the description as a whole.

The invention claimed is:

1. A method for offline data synchronization for a representation of a space, the method comprising:

localizing, by a data capture device, the data capture device in the space using at least one of image and depth data;

obtaining, by the data capture device, a spatial data representation of the space including target capture points representing target locations in the space;

detecting, by the data capture device, a presence or an absence of a connection to a server, wherein:

if the presence is detected, then:

sending the spatial data to the server; the spatial data having a first data size; the server to generate synchronized data that synchronizes conflicts between the spatial data and additional spatial data having a second data size; the additional spatial data from a nearby additional data capture device within the space; the synchronized data having a third data size less than the first data size plus the second data size;

if the absence is detected then:

detecting, by the data capture device, a nearby additional data capture device; the detecting based on a wireless signal from the data capture device to the nearby additional data capture device;

in response to detecting the additional data capture device, establishing a communications channel to the additional data capture device;

receiving, from the additional data capture device, the additional spatial data generated by the additional data capture device representing the space;

generating, at the data capture device, the synchronization data; and sending the synchronization data to the additional capture device via the communications channel; the additional data capture device to send the synchronized data to the server;

detecting a disconnection from a server configured to manage the representation of the space; and performing the detecting of the additional nearby data capture device in response to detecting the disconnection.

2. The method of claim 1, further comprising:

receiving, from the additional capture device via the communications channel, incoming synchronization data; and updating a locally stored representation of the space based on the incoming synchronization data.

3. The method of claim 2, further comprising in response to detecting a connection to a server configured to manage the representation of the space, sending the updated locally stored representation of the space to the server.

4. The method of claim 1, wherein the communications channel comprises one of: a wireless local area network communications channel and a short-range wireless communications channel.

5. The method of claim 1, wherein the synchronization data further comprises a location of the data capture device.

6. The method of claim 1, wherein the synchronization data further comprises annotations.

7. The method of claim 1, wherein detecting the additional data capture device comprises broadcasting a signal to identify nearby data capture devices.

8. The method of claim 1 wherein generating data representing space comprises:

receiving a frame from the first data capture device of a target area of the space;

determining pose information within the target area;

converting the pose information into visual representation data;

updating a stored representation of the space based on the visual representation data.

9. The method of claim 8 wherein the determining pose information within the target area comprises using a Simultaneous Localization and Mapping (SLAM) algorithm.

10. The method of claim 8 wherein the sending synchronization data to the additional capture device includes sending the pose information and depth frame.

11. The method of claim 8 wherein the sending synchronization data to the additional capture device includes sending data points within the target area.

12. The method of claim 8 wherein the sending synchronization data to the additional capture device includes volumetric information.

13. The method of claim 12 wherein the volumetric information is based on at least one of voxels and Truncated Signed Distance Function (TSDF) volume.

* * * * *